United States Patent [19]

Cassarly et al.

[11] Patent Number: 5,563,977
[45] Date of Patent: Oct. 8, 1996

[54] DISPLAY SYSTEM HAVING GREYSCALE CONTROL OF FIBER OPTIC DELIVERED LIGHT OUTPUT

[75] Inventors: William J. Cassarly; John M. Davenport, both of Lyndhurst; Richard L. Hansler, Pepper Pike, all of Ohio; Jean-Pierre Vanderreydt, Brussels, Belgium; Allen Miller, Peachland, Canada

[73] Assignee: General Electric Company, Schenectady, N.Y.

[21] Appl. No.: 449,156

[22] Filed: May 24, 1995

[51] Int. Cl.⁶ ........................................... G02B 6/04
[52] U.S. Cl. ..................... 385/115; 359/259; 359/264; 385/901
[58] Field of Search ........................... 385/115, 116, 385/120, 121, 147, 901; 359/259, 264

[56] References Cited

U.S. PATENT DOCUMENTS

| | | |
|---|---|---|
| 5,033,814 | 7/1991 | Brown et al. ................. 385/116 X |
| 5,247,600 | 9/1993 | Williams et al. ................. 385/115 |
| 5,293,437 | 3/1994 | Nixon ................................. 385/115 |

*Primary Examiner*—John D. Lee
*Attorney, Agent, or Firm*—George E. Hawranko; Stanley C. Corwin

[57] ABSTRACT

A display system having a greyscale control arrangement for controlling light output from a plurality of optical fibers includes a light source effective for supplying a high brightness light output to the input ends of the plurality of optical fibers. A plurality of piezoelectric shutter members are disposed adjacent the light delivery ends of the optical fibers and are effective for controlling the delivery of light output through the optical fibers as a function of the on or off condition thereof. The delivery ends of the optical fibers are disposed relative to one another so as to form a plurality of display pixels. At least two of the optical fibers are combined to form each of the pixels. The diameters of the at least two optical fibers that make up each pixel are different thereby allowing that at least four different greyscale levels can be achieved for each display pixel.

13 Claims, 2 Drawing Sheets

DISPLAY SYSTEM HAVING GREYSCALE CONTROL OF FIBER OPTIC DELIVERED LIGHT OUTPUT

FIELD OF THE INVENTION

This invention relates to a display system having greyscale control of light output from an optical fiber. More particularly, this invention relates to such a display system greyscale control arrangement as can achieve a high number of greyscale levels using a minimum number of components and doing so at an economical cost.

BACKGROUND OF THE INVENTION

Recent developments in the lighting field have allowed for the use of a centralized lighting system to be applied to a variety of product areas where it is desirable to utilize a single light source and a plurality of optical fibers to distribute the high brightness light output from the light source to at least one location remote from the light source. As an example, a centralized lighting system has been proposed for automotive uses where a light source could be disposed under the hood of the vehicle and the light for forward lighting, or interior panel lights could be delivered over optical fibers. An example of such a centralized lighting system can be found in Davenport et al U.S. Pat. No. 4,958,263 on Sep. 18, 1990 and assigned to the same assignee as the present invention. In this patent, a light source is provided having a central ellipsoidally shaped arc tube and a number of extending tube shaped extensions formed thereon. Each of the extending tube portions is coupled over optical fibers to various locations around a vehicle for providing lighting needed for forward illumination, tail lighting and overhead lighting for instance. Centralized lighting systems have been proposed for other areas as well such as for instance, for displaying merchandise in a retailing environment where it is desirable to illuminate certain merchandise in a favorable manner. By the use of a centralized lighting system for such an application, an optical fiber can be used to provide light output which is uniform in color and intensity and, furthermore, will not expose the merchandise to the heat or other radiation of a conventional display lighting arrangement.

Still another application of a centralized lighting system would be in a projection lighting system such as a message display at a sports arena or other setting where information or images are displayed to large numbers of people from a single display board. One of the problems associated with displaying information or images on a large screen display board from a centralized light source is in achieving a sufficient number of distinct output levels to convey the intended information or display the appropriate image. For a centralized light source that does not include a light switching arrangement, logic would dictate that there are two possible light outputs for each optical fiber, one being defined as a light "on" condition and the other as the light source being "off". Accordingly, in order for a centralized lighting system to be advantageous to a display board application, it will be necessary to include a light switching arrangement that could provide various levels of light output. Such a switching arrangement must simultaneously provide the characteristics of: high contrast ratios (e.g. greater than 100:1), low insertion loss (e.g. greater than 90% Transmission), speeds which are greater than video rates, and a greyscale control of at least 8 levels. New polymer piezoelectric materials have allowed for the development of light switching techniques that have satisfied the first three of these characteristics; that is, high contrast ratios, low insertion losses and high speeds. For example, U.S. Pat. No. 5,052,777 issued to Ninnis et al on Oct. 1, 1991 describes a graphic display arrangement using bimorph gate devices as light switches. Though effective for achieving high contrast ratios, low insertion losses and high speed, as to the need to provide greyscale control of at least eight levels, present techniques have been inadequate. For instance, using a pulse width modulation technique for switching the piezoelectric or bimorph gate device would yield a greyscale control having 3 different levels corresponding to "on", "off", and "half-on/half-off". This three level arrangement comes about by way of changing the image rate of operation for the bimorph gate device. One way to increase the number of greyscale levels using piezoelectric switches or shutters, would be to provide an array of such switches for each intended pixel of light output. Unfortunately, such an arrangement would be severely disadvantageous because of the cost factor for the arrays of switches and furthermore, because of the space requirements for such devices. Therefore, in designing a centralized lighting system that provided for at least eight levels of greyscale control, it would be advantageous to provide an arrangement that did not require a large number of piezoelectric shutters, and yet, still achieved all of the necessary operating characteristics such as high contrast ratio, low insertion losses, and speed.

SUMMARY OF THE INVENTION

The present invention provides a display system having greyscale control arrangement of fiber optic delivered light by the use of a minimum number of piezoelectric shutters. By the use of a unique configuration of the optical fibers in combination with the minimum number of piezoelectric devices, a greyscale control arrangement is achieved which has a plurality of greyscale levels in excess of 3 and up to as many as 27. In this manner, a display system is provided which allows for the display of information as well as 3-dimensional color still or animated images.

In accordance with the provisions of the present invention, there is provided a display system having a greyscale control arrangement for controlling light output from a centralized light source and which light output is transmitted through a plurality of optical fibers. A plurality of piezoelectric shutter members are disposed adjacent to delivery ends of the plurality of optical fibers. The piezoelectric shutter members are controlled to an on and an off condition by means of a control signal coupled thereto. The piezoelectric shutter members are effective so that when in an on condition, light is output from an associated light delivery end of the optical fiber and, when in an off condition, light is prevented from being delivered from the optical fiber. The delivery ends of the plurality of optical fibers are disposed in a cooperative relation to one another so as to form a plurality of pixels, the plurality of pixels being arranged and controlled in a manner so as to form a display. At least two of the optical fibers are combined in a manner so as to form each of the pixels and, the at least two optical fibers which form each pixel are of a different diameter so as to achieve a plurality of greyscale levels in excess of three.

BRIEF DESCRIPTION OF THE DRAWINGS

In the following detailed description, reference will be made to the attached drawings in which.

DETAILED DESCRIPTION OF THE INVENTION

Figure 1:
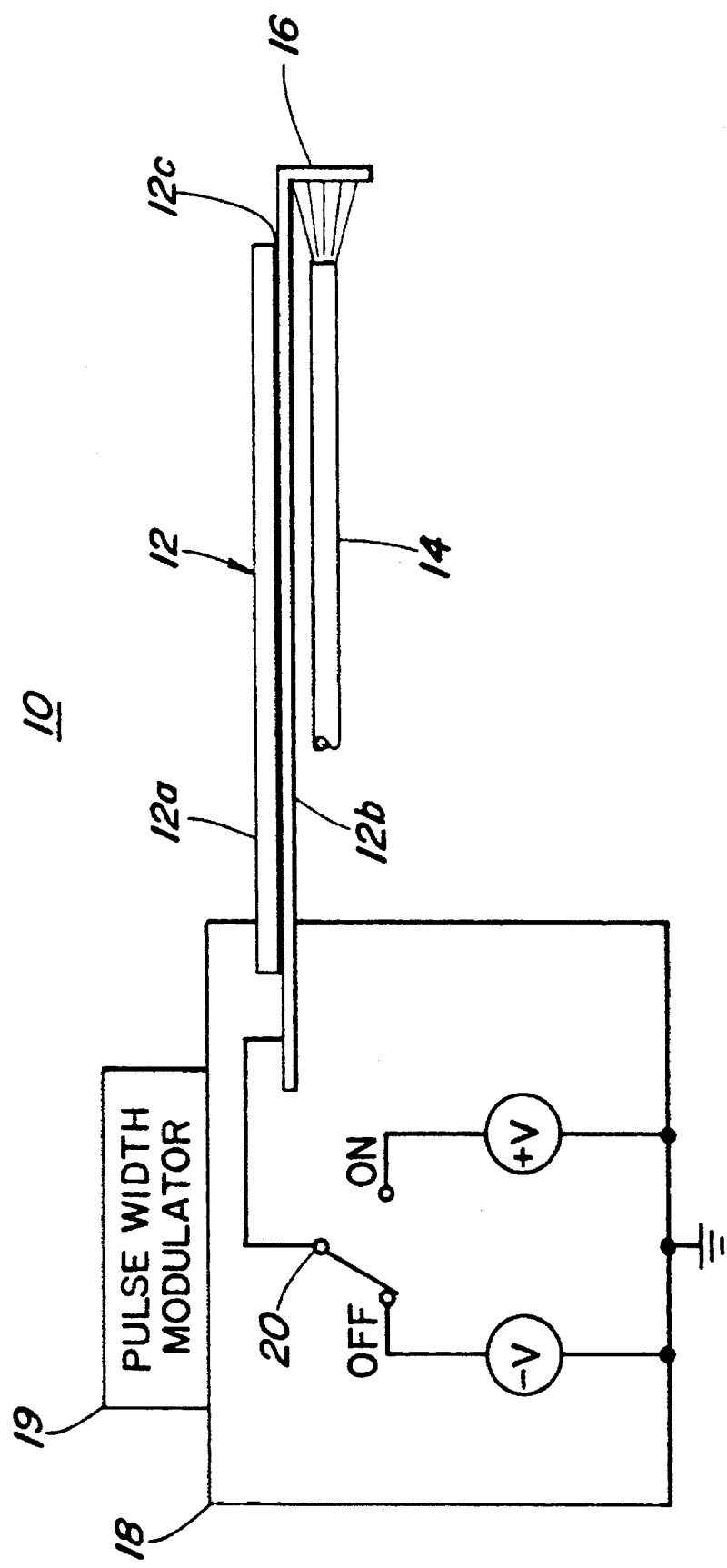
FIG. 1 is an elevational view in section of one display segment associated with the display system constructed in accordance with the present invention.
Figure 2:
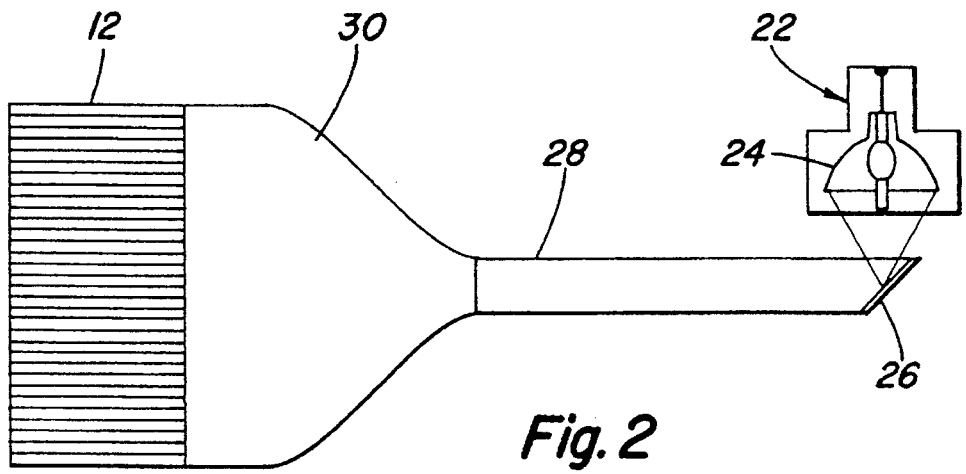
FIG. 2 is a top view in section of a row of display segments and associated light source arrangement for the display system constructed in accordance with the present invention.

Shown in FIG. 1 is one segment 10 of the overall display system of the present invention, such overall display system as will be discussed in further detail relative to FIGS. 2 and 3. For each individual segment of the overall display system, a piezoelectric shutter member 12 is provided in conjunction with an individual optical fiber 14.

For the piezoelectric shutter member 12, two sheets of piezo film 12a and 12b of opposite polarities are glued together by means of an epoxy 12c thus forming a bending element or bimorph. For the manufacture of the piezoelectric shutter member 12, piezoelectric polymers, or films are available commercially in rolls of thickness between 9 micrometers and 1 millimeter from the AMP Flexible Film Products Group in Valley Forge, Pa. 19482 as their product number 65751. In the operation of the piezoelectric shutter member 12, an applied voltage will cause one film to lengthen while the other contracts thereby causing the device to bend. An applied voltage of the opposite polarity bends the piezoelectric shutter member in the opposite direction. The physical configuration of the piezoelectric shutter member 12 converts small length changes into sizeable tip deflections.

By folding the tip portion at a right angle, a shutter section 16 is formed at one end of the piezoelectric shutter member 12. The piezoelectric shutter member 12 is then disposed relative to the delivery end of the optical fiber 14 so that the light output therefrom can either be passed or interrupted thus achieving two levels of greyscale control, that is, "on" and "off". Of course, by pulse width modulation techniques, the piezoelectric shutter member 12 can assume an intermediate position of "half-on/half-off" thereby increasing the greyscale levels to three. A pulse width modulator 19 is provided to control the piezoelectric shutter member 12 to the "half-on" condition.

In order to control the polarization of the piezoelectric shutter member 12, a control device 18 is provided. The control device 18 includes a switch member 20 which can be operated into one of two positions corresponding to an off and an on condition for the piezoelectric shutter member 12. As illustrated, a negative voltage results in an off condition for the shutter member 12 whereas a positive voltage results in an on condition for the shutter member 12. Of course, it should be understood that the control arrangement 18 shown herein is for illustration purposes only and is not intended to limit the scope of the present invention; for instance, the control function can easily be performed by means of integrated circuit technology wherein a large number of switch members can be packaged in a small device.

In forming an overall display system using the segment 10 of FIG. 1, it is possible to use a single light source 22 to provide sufficient light output for a number of such display segments 10. The light source 22 for such an application can be provided by means of the centralized lighting system known as the Light Engine® lighting system available from GE Lighting. The Light Engine centralized lighting system utilizes a high brightness xenon metal halide lamp as described in Mathews et al U.S. Pat. No. 5,239,230 on Aug. 24, 1993 and issued to one of the assignees of the present invention. The light source 22 includes a reflector member 24 which is effective for focussing the light output into a beam which is directed to a light redirecting member 26. The light redirecting member 26 can be provided by means of a prism or other light turning device such as a cold mirror. The light output after having been turned by the light redirecting member 26 is passed through an optical coupling member 28 which is effective for mixing the light output such that a substantially uniform light output in terms of color and intensity, is achieved. For a discussion of this type of optical coupling device, reference is hereby made to Davenport et al U.S. Pat. No. 5,341,445 on Aug. 24, 1994 and assigned to one of the assignees of the present invention.

The light output from the optical coupling member 28 is then coupled into a bundle of optical fibers 30 which is comprised of a group of fibers having at least 2 different diameters associated therewith. As shown in FIG. 2, the output ends of the optical fibers 30 are then fanned out into a comb-shaped pattern at which individual piezoelectric shutter members 12 can be disposed for the individual control of each output end of the respective optical fiber. Each comb-shaped grouping of optical fibers and respective piezoelectric shutter members 12, form a shelf or row associated with the overall display system. For instance, each shelf, or row could include 30 optical fiber/piezoelectric shutter member configurations as well as the switch control arrangement 18 of FIG. 1, all of which could be laid out in a printed circuit board configuration. Additionally, dichroic red, green and blue filters can be placed in front of the individual fiber delivery ends to achieve a color display output.

Figure 3:
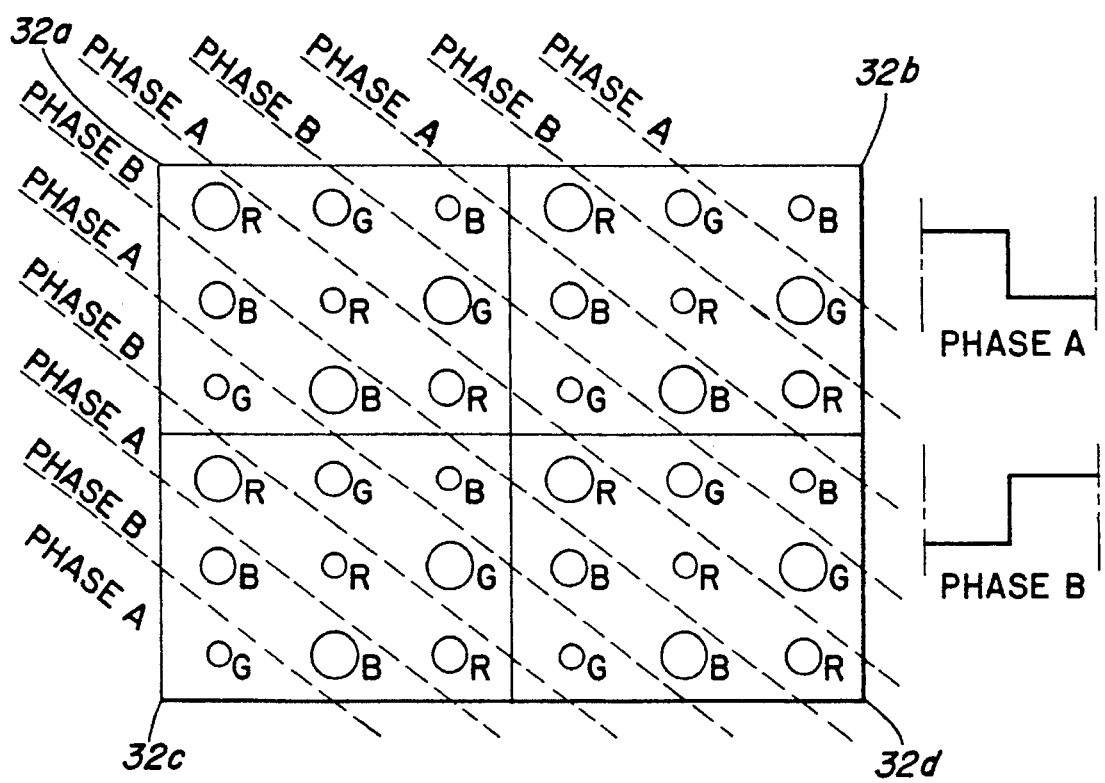
FIG. 3 is an elevational view in section of a segment of the output of the display system constructed in accordance with the present invention.

As seen in FIG. 3, the overall display system will include a plurality of pixel segments 32a, 32b, 32c, and 32d each of which includes 9 optical fiber/piezoelectric shutter member arrangements. Of course, it can be understood that the 3×3 arrangement for each pixel is a matter of design choice and could also be achieved by other sized arrangements. Additionally, the use of the shelf arrangement as described relative to FIG. 2 is also a design choice and could be substituted for using a different configuration without departing from the scope of the present invention. In the 9 segment per pixel arrangement of FIG. 3, it will be noted that there are 3 segments per color and that the diameter of the optical fibers that comprise each color are all distinct. Furthermore, it should be noted that the different sized optical fibers which form each color of the pixel are disposed diagonally, the diagonal pattern is used because the eye is less sensitive to diagonal structures.

By using three optical fibers of different size per color in a pixel 32a, the number of greyscale levels can be increased providing the section surface of the optical fibers are in the right ratio and are selected to avoid redundancies and provide uniform level spacing. In this implementation, a 1:3 ratio is used; therefore, with 3 greyscale levels per fiber (on, off, half-on), 27 greyscale levels can be provided. If the surface area of one fiber is assigned a value of 1 (A=1), a second fiber will have a value of 1/3 (B=1/3) while the third fiber will have a value of 1/9 (C=1/9). Therefore, using a pulse width modulation technique, of on, off and 1/2 on, the greyscale values will be 0, 1/2×C=1/18, C or 2/18, 1/2=B= 3/18, 1/2×C+1/2×B=4/18, C+1/2B=5/18, B=6/18, . . . , A=18/18, A+1/2×C=19/18, ..., A+B+C=26/18, for 27 different levels.

Though illustrated in a manner such that 3 different sized optical fibers are used for each color or each pixel, it is possible to utilize only two optical fibers of different sizes to achieve an increase in greyscale levels over conventional methods. For instance, if two fibers were used where one fiber had an area of 0.5 while the other had an area of 1.5, it would be possible to achieve 9 different greyscale levels if pulse width modulation were utilized as well. For such an arrangement the greyscale levels would be 0, 0.25 which is (1/2×0.5), 0.5, 0.75, 1 which is (1/2×1.5), 1.25, 1.5, 1.75, and 2. By contrast, if two optical fibers of the same diameter were utilized in conjunction with a pulse width modulation technique, there would be 9 states, however, because of redundancies, there would only be 5 different greyscale levels.

Although the hereinabove described embodiments of the invention constitute the preferred embodiments, modifications can be made thereto without departing from the scope of the invention as set forth in the appended claims. For example it would be possible to use a pulse width modulation technique that was other than a half-on/half-off arrangement, such as a PWM technique that utilizes a 1/4 on, 3/4 off or some other variation.

We claim:

1. A display system having a greyscale control arrangement for controlling light output from a plurality of optical fibers, said display system comprising:

a light source providing a substantially uniform light output;

a plurality of optical fibers extending from said light source to a light delivery location;

a plurality of piezoelectric shutter members disposed adjacent to light delivery ends of said plurality of optical fibers, said piezoelectric shutter members being controllable to an on and an off condition as a function of a control signal coupled thereto, said piezoelectric shutter members being effective so that when in an on condition, light is output from an associated light delivery end of an associated optical fiber and, when in an off condition, light is blocked from delivery from said associated light delivery end;

said delivery ends of said plurality of optical fibers being disposed in a cooperative relation to one another so as to form a plurality of pixels, said plurality of pixels being arranged and controlled in a manner so as to form a display; and, wherein at least two optical fibers go into forming each of said pixels and said at least two optical fibers have at least two different diameters associated therewith so as to achieve a plurality of greyscale levels in excess of three.

2. A display system as set forth in claim 1 wherein said at least two optical fibers that form each of said pixels comprises three optical fibers combined in a manner to form one color pixel and, wherein said three optical fibers forming said one color pixel have different diameters associated therewith.

3. A display system as set forth in claim 2 further comprising a pulse width modulator effective so as to generate said control signal such that a three state operation of said piezoelectric shutter member is achieved, said three states being on, off, and half-on, wherein said three optical fibers that form said one color pixel have a surface ratio of 1:3:9 relative to one another resulting in 27 greyscale levels.

4. A display system as set forth in claim 2, wherein said three optical fibers that form said one color pixel are disposed diagonally relative to one another; and, wherein the three optical fibers pulsate simultaneously with one another and with a second set of optical fibers disposed diagonally and parallel to said three optical fibers, said second set of optical fibers being separated from said three optical fibers by a third set of optical fibers, for reducing visible flicker.

5. A display system as set forth in claim 1 wherein each of said plurality of pixels includes a group of optical fibers combined in a manner so as to form distinct color pixel segments within each of said plurality of pixels, said group of optical fibers being combined so as to form at least a red color pixel segment, a blue color pixel segment and a green color pixel segment.

6. A display system as set forth in claim 5 wherein three optical fibers form each of said color pixel segments and wherein three optical fibers that form each of said color pixel segments have different diameters associated therewith, said different diameters being defined by the surface ratio of 1:3:9 to one another.

7. A display system as set forth in claim 1 further comprising an optical coupling member disposed between said light source and an input end of said plurality of optical fibers, said optical coupling member being effective for mixing such light output from said light source so as to achieve said substantially uniform light output in terms of color and intensity.

8. A display system as set forth in claim 1 wherein said at least two optical fibers that form each of said pixels have different diameters which are related to one another in a ratio of 1:3 such that 9 different greyscale levels can be achieved thereby.

9. A display system as set forth in claim 1 wherein said at least two optical fibers that form each of said pixels comprises N optical fibers combined in a manner to form one color pixel and, wherein said N optical fibers forming said one color pixel have different diameters associated therewith, said display system further comprising a pulse width modulator effective so as to generate said control signal such that K-states of operation of said piezoelectric shutter members are achieved, said K-states being 0, 1, ..., (K-1) wherein said N optical fibers that form said one color pixel have a surface ratio of $N^0:N^1:\ldots:N^{N-1}$ relative to one another resulting in $K^N$ greyscale levels.

10. A greyscale control arrangement for controlling light output from a plurality of optical fibers, said greyscale control arrangement comprising:

a plurality of optical fibers having a light input end and a light delivery end associated therewith;

a plurality of piezoelectric shutter members disposed adjacent to a respective one of said light delivery ends of said plurality of optical fibers, said piezoelectric shutter members being controllable to an on and an off condition as a function of a control signal coupled thereto, said piezoelectric shutter members being effective so that when in an on condition, light is output from an associated light delivery end of an associated optical fiber and, when in an off condition, a shutter is extended over said light delivery end of an affected one of said plurality of optical fibers so that light is blocked from delivery therethrough;

wherein groupings of said plurality of optical fibers are combined in a manner to form a plurality of display pixels;

wherein said groupings of said plurality of optical fibers include at least three optical fibers per display pixel and wherein said at least three optical fibers have different diameters associated therewith so that, by control of said piezoelectric shutter member associated with each of said optical fibers, at least 4 greyscale levels can be achieved for each of said display pixels; and, wherein said at least three optical fibers that form said one display pixel have a surface ratio of 1:3:9 relative to one another thereby resulting in the generation of greater than 9 greyscale levels.

11. A greyscale control arrangement as set forth in claim 10 wherein each of said plurality of display pixels includes said grouping of optical fibers combined in a manner so as to form distinct color pixel segments within each of said plurality of display pixels, said groupings of optical fibers being combined so as to form at least a red color pixel segment, a blue color pixel segment and a green color pixel segment.

12. A greyscale control arrangement for controlling light output from a plurality of optical fibers, said greyscale control arrangement comprising:

a plurality of optical fibers having a light input end and a light delivery end associated therewith;

a plurality of piezoelectric shutter members disposed adjacent to a respective one of said light delivery ends of said plurality of optical fibers, said piezoelectric shutter members being controllable to an on and an off condition as a function of a control signal coupled thereto, said piezoelectric shutter members being effective so that when in an on condition, light is output from an associated light delivery end of an associated optical fiber and, when in an off condition, a shutter is extended over said light delivery end of an affected one of said plurality of optical fibers so that light is blocked from delivery therethrough;

wherein groupings of said plurality of optical fibers are combined in a manner to form a plurality of display pixels;

wherein said groupings of said plurality of optical fibers include at least three optical fibers per display pixel and wherein said at least three optical fibers have different diameters associated therewith so that, by control of said piezoelectric shutter member associated with each of said optical fibers, at least 4 greyscale levels can be achieved for each of said display pixels;

wherein said at least three optical fibers that form said one display pixel are disposed diagonally relative to one another; and, wherein the three optical fibers pulsate simultaneously with one another and with a second set of optical fibers disposed diagonally and parallel to said three optical fibers, said second set of optical fibers being separated from said three optical fibers by a third set of optical fibers, for reducing visible flicker.

13. A greyscale control arrangement for controlling light output from a plurality of optical fibers, said greyscale control arrangement comprising:

a plurality of optical fibers having a light input end and a light delivery end associated therewith;

a plurality of piezoelectric shutter members disposed adjacent to a respective one of said light delivery ends of said plurality of optical fibers, said piezoelectric shutter members being controllable to an on and an off condition as a function of a control signal coupled thereto, said piezoelectric shutter members being effective so that when in an on condition, light is output from an associated light delivery end of an associated optical fiber and, when in an off condition, a shutter is extended over said light delivery end of an affected one of said plurality of optical fibers so that light is blocked from delivery therethrough; and, a pulse width modulator effective so as to generate said control signal such that a three state operation of said piezoelectric shutter member is achieved, said three states being on, off and half-on;

wherein groupings of said plurality of optical fibers are combined in a manner to form a plurality of display pixels; and, wherein said groupings of said plurality of optical fibers include at least three optical fibers per display pixel and wherein said at least three optical fibers have different diameters associated therewith so that, by control of said piezoelectric shutter member associated with each of said optical fibers, at least 4 greyscale levels can be achieved for each of said display pixels.

* * * * *